US008103574B2

(12) United States Patent
Wiesehuegel et al.

(10) Patent No.: US 8,103,574 B2
(45) Date of Patent: Jan. 24, 2012

(54) ONLINE OFFER AND BID MANAGEMENT WITH SEALED BIDS

(75) Inventors: Leland James Wiesehuegel, Austin, TX (US); Rebecca Lynn Roberts, Austin, TX (US); William James Morrison, Gilmanton, NH (US)

(73) Assignee: International Business Machines Corporation, Armonk, NY (US)

( * ) Notice: Subject to any disclaimer, the term of this patent is extended or adjusted under 35 U.S.C. 154(b) by 2207 days.

(21) Appl. No.: 09/726,009

(22) Filed: Nov. 29, 2000

(65) Prior Publication Data

US 2002/0065760 A1 May 30, 2002

(51) Int. Cl.
*G06Q 40/00* (2006.01)
(52) U.S. Cl. ........................................ 705/37
(58) Field of Classification Search ............... 705/35–38, 705/400, 57, 34, 51
See application file for complete search history.

(56) References Cited

U.S. PATENT DOCUMENTS

| | | | |
|---|---|---|---|
| 4,799,156 A | 1/1989 | Shavit et al. | |
| 4,984,155 A | 1/1991 | Geier et al. | |
| 5,117,354 A | 5/1992 | Long et al. | |
| 5,117,355 A | 5/1992 | McCarthy | |
| 5,136,501 A * | 8/1992 | Silverman et al. | 705/37 |
| 5,154,738 A | 10/1992 | Armstrong | |
| 5,303,379 A | 4/1994 | Khoyi et al. | |
| 5,319,542 A | 6/1994 | King, Jr. et al. | |
| 5,424,944 A | 6/1995 | Kelly et al. | |
| 5,640,569 A * | 6/1997 | Miller et al. | 710/241 |
| 5,799,157 A | 8/1998 | Escallon | |
| 5,835,896 A | 11/1998 | Fisher et al. | |
| 5,870,719 A | 2/1999 | Maritzen et al. | 705/26 |
| 5,897,639 A | 4/1999 | Greef et al. | |
| 5,924,083 A | 7/1999 | Silverman et al. | |

(Continued)

FOREIGN PATENT DOCUMENTS

WO    WO 00/39735    7/2000

OTHER PUBLICATIONS

Online: Make a name for yourself on the net: As new countries get their internet domains, it opens up a whole new world for astute dealers in company titles. Richard Heller. The Guardian. Manchester (UK): Oct. 26, 2000. p. 12.*

(Continued)

*Primary Examiner* — Alexander Kalinowski
*Assistant Examiner* — Clement B Graham
(74) *Attorney, Agent, or Firm* — Robert H. Frantz; Mark C. Vallone; David A. Mims, Jr.

(57) ABSTRACT

A computer system for a manufacturer or service provider to communicate goods or services which are available for bidding by bidders that provides collected bids in a bid database, the bids each having an associated seal status indication field queries the bid database for unsealed bids which match parameters of a Broker Profile Matrix associated with a trader console, the trader console comprising an intermediary third party user console communicably disposed between a bidder user console and broker user console, operates to buy products or services from the broker user console and to resell the bought products and services to the bidder user console; responsive to finding matching unsealed bids, delivers the matching unsealed bids to the trader console wherein delivery of delivery of sealed bids to the trader console is prevented; and displays on the trader console the delivered matching unsealed bids to a trader console user.

18 Claims, 6 Drawing Sheets

U.S. PATENT DOCUMENTS

| | | | |
|---|---|---|---|
| 5,950,173 | A | 9/1999 | Perkowski |
| 5,999,915 | A | 12/1999 | Nahan et al. |
| 6,006,201 | A | 12/1999 | Berent et al. |
| 6,012,045 | A | 1/2000 | Barzilai et al. ............... 705/37 |
| 6,023,686 | A | 2/2000 | Brown |
| 6,029,160 | A | 2/2000 | Cabrera et al. |
| 6,032,145 | A | 2/2000 | Beall et al. |
| 6,044,363 | A | 3/2000 | Mori et al. |
| 6,055,518 | A * | 4/2000 | Franklin et al. ............... 705/37 |
| 6,058,379 | A * | 5/2000 | Odom et al. ............... 705/37 |
| 6,085,169 | A | 7/2000 | Walker et al. |
| 6,131,087 | A | 10/2000 | Luke et al. |
| 6,134,534 | A | 10/2000 | Walker et al. |
| 6,147,686 | A | 11/2000 | Brown et al. |
| 6,161,099 | A * | 12/2000 | Harrington et al. ........... 705/37 |
| 6,173,377 | B1 | 1/2001 | Yanai et al. |
| 6,199,048 | B1 | 3/2001 | Hudetz et al. |
| 6,199,050 | B1 | 3/2001 | Alaia et al. |
| 6,216,114 | B1 | 4/2001 | Alaia et al. |
| 6,272,472 | B1 | 8/2001 | Danneels et al. |
| 6,389,402 | B1 * | 5/2002 | Ginter et al. ............... 705/51 |
| 6,415,269 | B1 | 7/2002 | Dinwoodie |
| 6,449,601 | B1 | 9/2002 | Friedland et al. |
| 6,453,325 | B1 | 9/2002 | Cabrera et al. |
| 6,484,153 | B1 * | 11/2002 | Walker et al. ............... 705/38 |
| 6,505,172 | B1 | 1/2003 | Johnson et al. |
| 6,532,481 | B1 | 3/2003 | Fassett, Jr. |
| 6,535,880 | B1 | 3/2003 | Musgrove et al. |
| 6,564,192 | B1 | 5/2003 | Kinney et al. |
| 6,598,029 | B1 * | 7/2003 | Johnson et al. ............... 705/37 |
| 6,606,603 | B1 | 8/2003 | Joseph et al. |
| 6,985,885 | B1 * | 1/2006 | Goldberg et al. ............... 705/37 |
| 7,475,009 | B2 | 1/2009 | Ishikura |
| 7,475,025 | B2 | 1/2009 | Wiesehuegel et al. |
| 7,702,560 | B1 | 4/2010 | Wiesehuegel et al. |
| 7,801,793 | B2 | 9/2010 | Wiesehuegel et al. |
| 2001/0027431 | A1 | 10/2001 | Rupp et al. |
| 2001/0032162 | A1 | 10/2001 | Alsberg et al. |
| 2001/0047308 | A1 | 11/2001 | Kaminsky et al. |
| 2002/0007318 | A1 | 1/2002 | Alnwick |
| 2002/0038282 | A1 | 3/2002 | Montgomery |
| 2002/0059131 | A1 | 5/2002 | Goodwin et al. |
| 2002/0059132 | A1 | 5/2002 | Quay et al. |
| 2002/0065760 | A1 | 5/2002 | Wiesehuegel et al. |
| 2002/0082953 | A1 | 7/2002 | Batham et al. |
| 2002/0103721 | A1 | 8/2002 | Wiesehuegel et al. |
| 2002/0128948 | A1 | 9/2002 | Wiesehuegel et al. |
| 2002/0184084 | A1 | 12/2002 | Lidow |
| 2003/0009392 | A1 | 1/2003 | Perkowski |
| 2003/0051068 | A1 | 3/2003 | Eldridge et al. |
| 2003/0083983 | A1 | 5/2003 | Fisher et al. |
| 2005/0234811 | A1 * | 10/2005 | Herman et al. ............... 705/37 |
| 2007/0055615 | A1 | 3/2007 | Howell et al. |
| 2009/0030813 | A1 | 1/2009 | Wiesehuegel |

OTHER PUBLICATIONS

United States Patent and Trademark Office; Notice of Allowance dated Mar. 8, 2010 in related U.S. Appl. No. 09/821,106, filed Mar. 29, 2001, Leland James Wiesehuegel.

Microsoft; definition of "proxy" and "proxy server", Microsoft Computer Dictionary, 5th Edition, 2002, p. 428.

Schwing, H. James; "Regulation of the U.S. secondary mortgage market", Housing Finance International, Sep. 1, 2001, published online by AllBusiness of San Francisco, CA, USA, downloaded from http://www.allbusiness/finance-insurance/credit-intermdiation-related/103-0102-1.html on Jan. 25, 2008.

Business Wire; "Unisys Announces Its Strategic Service Partnership Program, Giving Computer Industry OEMs Access to Its Entire Portfolio of Distributed Computing Support Services, Business Editors", May 4, 1998, p. 1, downloaded from ProQuest on the Internet on Mar. 26, 2008.

Goodwin, Thomas R., et al; United States provisional U.S. Appl. No. 60/224,240, filed on Aug. 10, 2000, retrieved from the file wrapper of U.S. Appl. No. 09/928,109.

USPTO; recent examination correspondence (first Office Action mailed on Nov. 24, 2010 and first applicant's reply) in related U.S. Appl. No. 12/243,410, filed by Leland James Wiesehuegel on Oct. 1, 2008.

ILS BidQuest Clears Million-Dollar Mark; ILS Auction List Exceeds Six-Thousand Items PR Newswire. New York: Nov. 7, 2000. p. 1.

Ariba: Ariba Sourcing now available; Function-rich platform introduces RFQ-based procurement along commerce services network with enterprise and marketplace editions M2 Presswire. Coventry: Sep. 12, 2000. p. 1.

PurchasePro.com, Inc. Reports 109 Percent Sequential Revenue Growth for the Second Quarter of Fiscal 2000; [1] Business Editors.

Milgrom, Paul; "Putting Auction Theory to Work: The Simultaneous Ascending Auction"; see especially p. 4 lines 4-5 and p. 12 lines 30-38; retrieved on Jun. 25, 2008 from: http://www-econ.stanford.edu/faculty/workp/swp98002.pdf.

Leszczyc, Peter T.L., and Gerald Haubl, Abstract of "Bidding Frenzy: Intensity of Competitive Interaction Among Bidders and Product Valuation in Auctions", see especially pp. 5-6. Retrieved on Jun. 25, 2008 from: http://www.business.ualberta.ca/ppopkowski/Papers/ACR%20SPECIAL%20SESSION%20SUMMARY.doc. Also available at http://www.acrwebsite.org/volumes/display.asp?id=7910 published in "Advances in Consumer Research", vol. 28, 2001, pp. 451-453.

USPTO; Examination Correspondence from a Related U.S. Appl. No. 09/714,726; filed on Nov. 16, 2000 by Leland James Wiesehuegel.

USPTO; Examination Correspondence from a Related U.S. Appl. No. 09/821,106; filed on Mar. 29, 2001 by Leland James Wiesehuegel.

USPTO; Recent Examination Correspondence from a Related U.S. Appl. No. 09/801,604; filed on Mar. 8, 2001 by Leland James Wiesehuegel.

USPTO; Recent Examination Correspondence from a Related U.S. Appl. No. 09/801,613; filed on Jan. 6, 2009 by Leland James Wiesehuegel.

USPTO; Recent Examination Correspondence from a Related U.S. Appl. No. 09/773,197; filed on Jan. 31, 2001 by Leland James Wiesehuegel.

* cited by examiner

*Prior Art*

ONLINE OFFER AND BID MANAGEMENT WITH SEALED BIDS

CROSS-REFERENCE TO RELATED APPLICATIONS (CLAIMING BENEFIT UNDER 35 U.S.C. 120)

This application is related to Ser. No. 09/714,726, filed on Nov. 16, 2000, by Leland James Wiesehuegel, et al which is commonly assigned with this application.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related application Ser. No. 09/714,726 which was filed by Leland James Wiesehuegel, et al on Nov. 16, 2000, is hereby incorporated it is entirety including drawings and is made a part of this application.

BACKGROUND OF THE INVENTION

1. Field of the Invention

The present invention relates generally to electronic commerce and more particularly to conducting an interactive offering and bid collection over a computer network wherein bids are kept sealed until the bidding is closed.

2. Description of the Related Art

Prior to the advent of electronic auctioning over computer networks or electronic commerce, auctions were held in a group of gathered bidders with an auctioneer. As shown in FIG. 1, an auction (1) is conducted on behalf of a seller (2) by an auctioneer (4). The auctioneer receives a list of items to be sold and possibly a minimum and/or or reserve price for those items. During the auction, a plurality of bidders (6) place bids (5) under the guidance and control of the auctioneer (4). In some cases, multiple bidders (9) may pool (8) their bids, and the pooled bids (7) are submitted as a single bid with a combined quantity to the auctioneer (4).

The auctioneer enforces the rules of the auction, such as minimum bid price and quantities, minimum bid incrementing from the previous bid for a new bid, and time limits for placing bids. Auction bidders are typically qualified as to their ability to complete the purchase should their bid be the winning bid prior to entering the auction room.

Many online auctioning systems such as "priceline.com" and "mercata.com" have become very popular for individuals and businesses to use to take advantage of auctions at which they cannot be physically present. Such e-commerce auctions or online auctions are usually conducted over a specified period of time of opening and closing for bids, and are typically conducted under one of several well-known sets of rules or models. These common models include "Dutch" auctions, progressive auctions, "Yankee" auctions, single-bid auction, sealed bid auctions, reserve auctions, and hybrids of these types of auctions.

However, most sales offering and bid systems conducted by manufacturers of goods or service providers are conducted under a different set of procedures and processes. Turning to FIG. 2, a typical trader and broker system for offering and accepting bids is shown (20). In such a business-to-business ("B2B") offering and bidding process (20), a manufacturer or service provider (21) will notify one or more traders (24) of available products or services, quantities, and minimum acceptable bid values (22). The trader then provides offerings (23') to one or more brokers (25), to which the brokers may respond with bids (23).

In some cases, bids may be accepted for either partial lots or whole lots of offered products. These offerings (23') and the corresponding bids (23) are collected by the trader, and the trader (24) makes a decision of which bids to accept. The traders (24) subsequently respond to the manufacturer or service provider (21) with actual orders or purchases (22).

Although the B2B offering and bid acceptance process may be conducted similarly to an auction, it is not an auction in the strict sense in that the order fulfillment, or bid acceptance, process is conducted usually by the trader at his discretion. For example, under a typical auction process, the highest qualified bidder may be defined as the bid winner. However, in a B2B offering and bid collection system, the trader may favor the second or third highest bid over the highest bid for the fact that the broker placing the second or third highest bid has preferred business arrangements, such as a longer history of purchasing from the trader or a history of larger volume purchases with the trader.

In the related application, a system and method was disclosed which allows filtered information to be used in offerings which are provided to brokers for their bids. The system and method allowed a particular trader or group of traders to filter information from larger comprehensive lists of available goods or items from a manufacturer or service provider and to produce offerings which only show the needed information for a particular broker to which to respond. This system protects the supplier of the goods from disseminating information to brokers which is irrelevant to the broker's entitlement to bid, or which might indicate a larger view or position understanding of the supplier's overall stock of an item.

Some processes of offering and collecting bids in B2B sales transactions are conducted in a single bidding process. In a single-bid process, each bidder is allowed to bid once on a particular item or commodity, unlike the auctioning process whereby each bidder is allowed to raise his previous bid to beat a current bid. Typically, a single-bid system of offering involves "sealed bids."

Sealed bids are intended to protect the confidentiality of the single bids which are placed earlier by other bidders from being seen or disseminated to the brokers or bidders who bid later. If the bids were not sealed, and information about the earlier bids were communicated to later bidding brokers, then the later bidding brokers would be able to beat the earlier bids but just by a minimal amount. This results in two problems, the first of which is that it does not produce the highest possible bid from the winning bidder or broker. In a situation where the brokers are unsure of what the other brokers will bid, a broker is encouraged to place his highest possible bid since he only has one chance to bid. The second problem is that if the sealed bids are communicated to the later bidding brokers, the later bidding broker will have an unfair advantage to beat the bid of the earlier bidding brokers.

In traditional manual systems of sealed bids, bids are physically sealed in envelopes and are not opened until the bidding period is closed. This is intended to physically ensure that the earlier received bids are kept confidential and sealed until all bids have been received. However, in online trading systems and online auctioning systems of the current technology, most systems actually display the current highest bid.

Other systems which provide for a single bid process to do not protect the electronic bid from being viewed by system administrators and internal personnel of the online bidding system operator.

Thus, there is the potential for internal personnel or system administrators to transfer or "leak" information about earlier received bids to brokers or bidders who have not yet bid. This may result, then, in a similar situation and similar disadvantages to the manual process of single sealed bids as described before.

Since electronic bids are more difficult to keep confidential and sealed, and since most users of online systems are aware of "hackers," many customers are reluctant to employ an online bidding system and online auctioning system that does not ensure through reliable methods that the sealed bids will remain confidential until bidding is closed.

Therefore, there is a need in the art for an online offering and bid collection system which provides a secure mechanism to collect online bids, and to keep those bids secure or sealed until certain conditions have been met, such as the expiration of a bidding time window. Further, there is a need in the art for this online sealed bid system to support or to integrate easily into existing online bid systems, such as the one disclosed in the related application.

Brokers typically buy on speculation and sell to end users. Brokers may sell to multiple retailers of products or services, or they may represent a single large retailer of a product or service.

Traders are typically commissioned sales professionals, and the structure of their commissions may vary depending on the quantities and the commodities or category of products being sold.

According to industry terminology, "Reseller Master Agreements" usually govern what a broker may purchase, which are enforced by the individual traders. For example, a particular broker may only have rights to purchase given commodities or categories of products within a certain geographical zone or region as defined by his Reseller Master Agreement with the manufacturer or service provider.

Further, traders may be restricted to handling specific commodities or categories of products and also may be restricted to certain localities. For example, a trader may specialize in furniture from a particular manufacturer, and may not be authorized to handle carpets or other textiles from the same manufacturer. This trader's expertise in furniture allows him to focus his knowledge and understanding into the market place for furniture. A trader may also be restricted as to the locality or geographical region in which his brokers may purchase gods, such as Europe, North America, or even more specific such as a particular state or city.

Thus, a particular broker may receive offers from multiple traders who represent a particular manufacturer or service provider. For example, a broker that represents a chain of computer stores may receive computer memory offerings from a first trader, software upgrade offers from a second trader, and peripheral offers from yet a third trader, all of whom represent the same manufacturer. In response, this broker may bid for products or services in different categories, and must submit those bids to different traders based on the traders' commodities or categories of products that each trader handles.

As such, it is desirable not to present information to the traders or brokers which is irrelevant to the products or commodities for which they are entitled to purchase under their Reseller Master Agreement. For example, certain brokers and traders may be associated with geographical regions which are not allowed to receive certain products or services from the manufacturer because of regulatory or export controls. Additionally, certain contractual restrictions between the manufacturer and the trader or other traders and other brokers may establish territorial boundaries regarding products and services handled by the brokers and traders. Further, even though a broker may be entitled to receive offers for a particular product or service, it may not be desirable to indicate to that broker the total quantity available from the manufacturer, as having this knowledge may not encourage the broker to place his highest possible bid for the product or service.

Therefore, the available online auctioning systems are not appropriate in such B2B offering and bid collection systems. First, the available online auctioning systems represent a full auction under which certain rules dictate which bids will be automatically accepted, so the system provides offerings of available quantities, bid collection, bid rule enforcement, bid fulfillment, and bid acceptance functions under the rules of the auction. Consequently, as previously discussed, B2B offerings and bid collections are not executed under such strict rules. Further, the available online auction systems are particularly adapted to placement of orders by multiples of bidders or pooled bidders, and do not favor the traditional interaction between traders and brokers. And, most online auctioning systems provide information as to last top bid ("bid to beat") and total quantities of goods available.

As such, the available online auction systems do not allow for the restriction and filtering of information which is conveyed from the offering party to the offered party to eliminate the presentation of information which is not relevant to the offered party's Reseller Master Agreement. This may not protect the confidentiality of total quantities available from the offering party, and may compromise the ability of the offering party to obtain the best possible bids for the goods offered.

Therefore, there is a need in the art for an online business-to-business offering and bid collection system which is suitable for offering manufactured goods and/or services to potential purchasers or brokers. There is a need in the art for this system to provide for filtering or restriction of information about the offered good to such potential purchasers or brokers such that confidentiality requirements, regulatory and territorial requirements can be met.

Additionally, there is a need in the art for this system to be robust, dependable, secure, and adaptable for use with a wide array of manufactured goods such as electronics, consumer products, clothing and textiles, other large volume purchase goods, as well as real-time traded commodities such as electric power, water, and telecommunications and data communications bandwidth.

BRIEF DESCRIPTION OF THE DRAWINGS

The following detailed description when taken in conjunction with the figures presented herein provide a complete disclosure of the invention.

SUMMARY OF THE INVENTION

In order to address the aforementioned needs in the art, a network computer arrangement and method for a manufacturer or service provider to communicate goods or services which are available for bidding provides collected bids in a bid database, the bids each having an associated seal status indication field; queries the bid database for unsealed bids which match parameters of a Broker Profile Matrix associated with a trader console, the trader console comprising an intermediary third party user console communicably disposed between a bidder user console and broker user console, operates to buy products or services from the broker user console and to resell the bought products and services to the bidder user console; responsive to finding matching unsealed bids, delivers the matching unsealed bids to the trader console wherein delivery of delivery of sealed bids to the trader console is prevented; and displays on the trader console the delivered matching unsealed bids to a trader console user.

DETAILED DESCRIPTION OF THE INVENTION

It will be recognized by those skilled in the art that certain combinations and integrations of the features presented herein may be made without departing from the spirit and scope of the invention. Further, it will be recognized that many of the architectural details disclosed herein are disclosed under the inventor's preferred embodiment in order to enhance the robustness and reliability of the invention, but these details may not be necessary to realize the fundamental functionality of the invention.

Throughout the disclosure given herein and the following claims, the term "broker" is used to describe a bidding party or bidder, and the term "trader" is used to describe a party who conducts the process of promoting offers to bidding parties. This is nearly analogous to bidder and auctioneer in the context of a traditional auction, respectively, although the offering and bidding process provided by the invention may be used to conduct business-to-business offers as well as traditional types of auctions.

General Description of the Interactive Offering System

Figure 1:
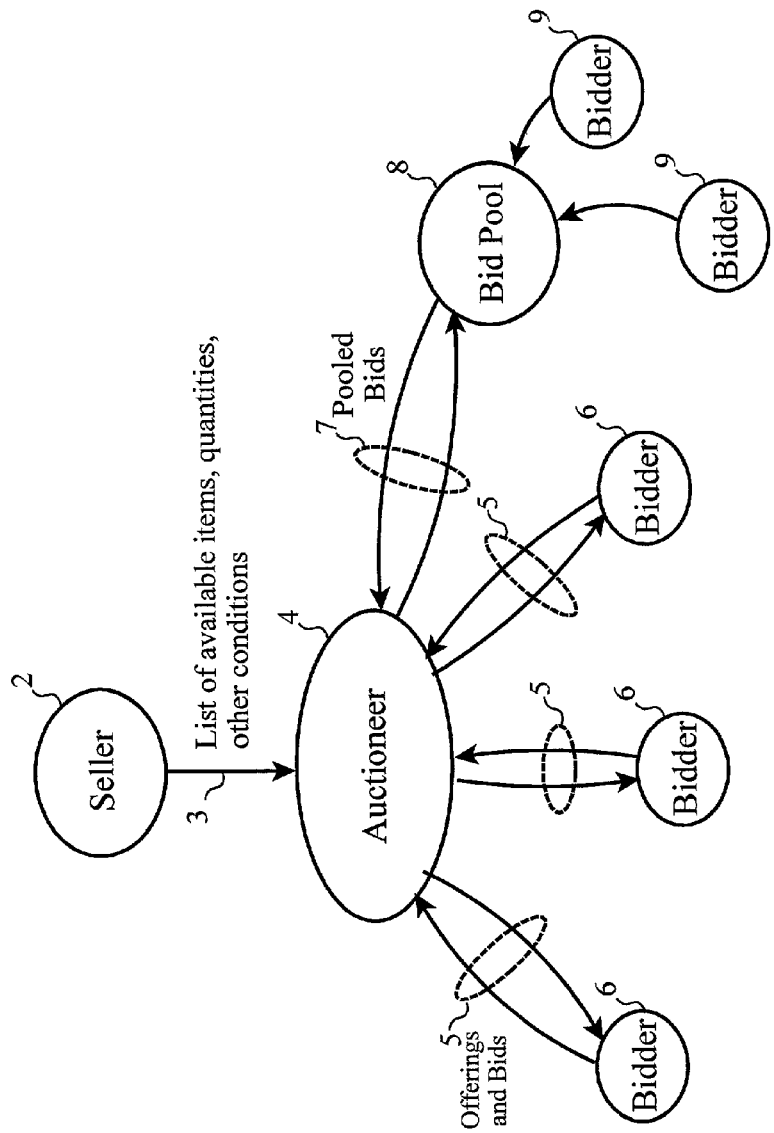
FIG. 1 discloses the well-known arrangement of sellers, auctioneers, and bidders.
Figure 2:
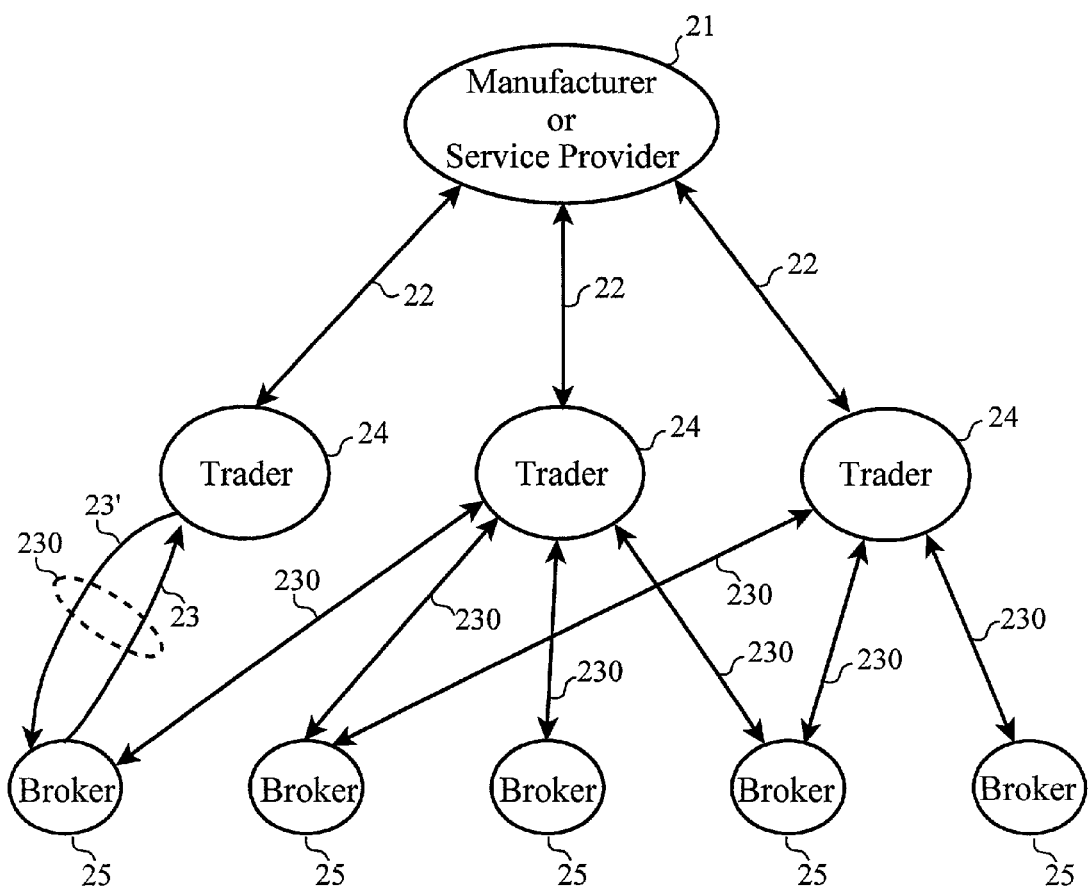
FIG. 2 shows the common business arrangement between manufacturers, service providers, traders, and brokers.
Figures 3, 4:
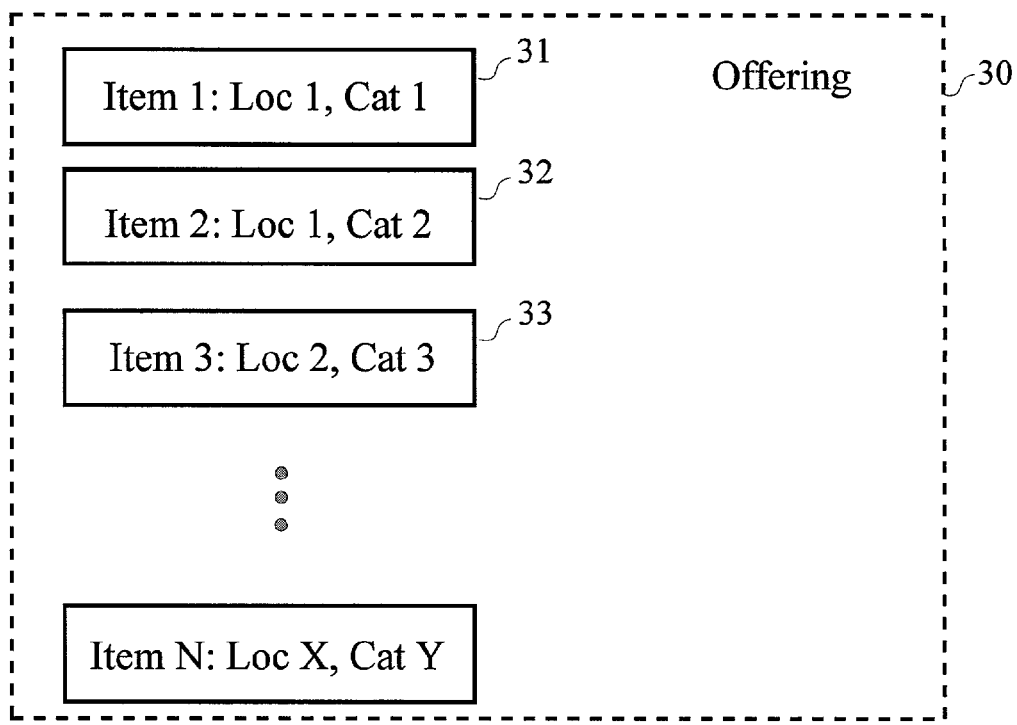
FIG. 3 shows the structure of offerings under the preferred embodiment.
FIG. 4 shows a broker profile matrix.

The following general description of the Interactive Offering System ("IOS") is summarized from the related application. Turning to FIG. 3, broker offerings (30) are comprised of one or more sets of materials (or services) associated with location and category code pairs. Typically, locations are related to geographical zones or regions such as countries, continents, or sales regions. Categories are typically related to products, product lines, or services such as computers, hard drives, monitors, minutes of long-distance, megabytes of transmission or other types of services and products. As such, an offering (30) which is presented to a broker contains only materials or services which are being made available to that broker for which the location and category code meet his broker profile. And, the offering may include materials for a combination of brokers. For example as shown in FIG. 3, an offering to a European broker may be comprised of a first material code pair such as location=Europe, and category=power supply, (31). It may also contain additional materials with associated location and category pairs, such as location=Europe and category=computer_monitor, and location=Germany and category=Deutsche_AIX_operating system. It may also include a second material, such as location=Europe and category=computer_monitor.

A broker profile matrix is disclosed in FIG. 4. For each broker, a broker profile matrix is defined, which is a two-dimensional table for location and category in this preferred embodiment. It will be recognized, however, by those skilled in the art that such a broker profile matrix may be multidimensional beyond the two-dimensional example shown, or single dimensional. In this example of FIG. 4, the locations are indexed against the plurality of categories, and then a logical enabler, such as a Boolean flag, is recorded for each combination of location and category pairs. A profile matrix defines the "entitlement" for a particular broker. Available products or services which match the location-category parameter pairs in a broker's entitlement profile matrix are made available to that broker, and products and services which do not meet the parameters of the profile matrix are not presented for bidding to that broker. For example in FIG. 4, the completed profile matrix for a hypothetical broker defines that the broker who is entitled to receive offerings for category_1 products in location_1 and location_3, and for category_2 products only in location_1, and for category_Y products only in location_1. The hypothetical broker of this example is not authorized or entitled to receive offerings for any other location-category parameter pair.

Figure 5:
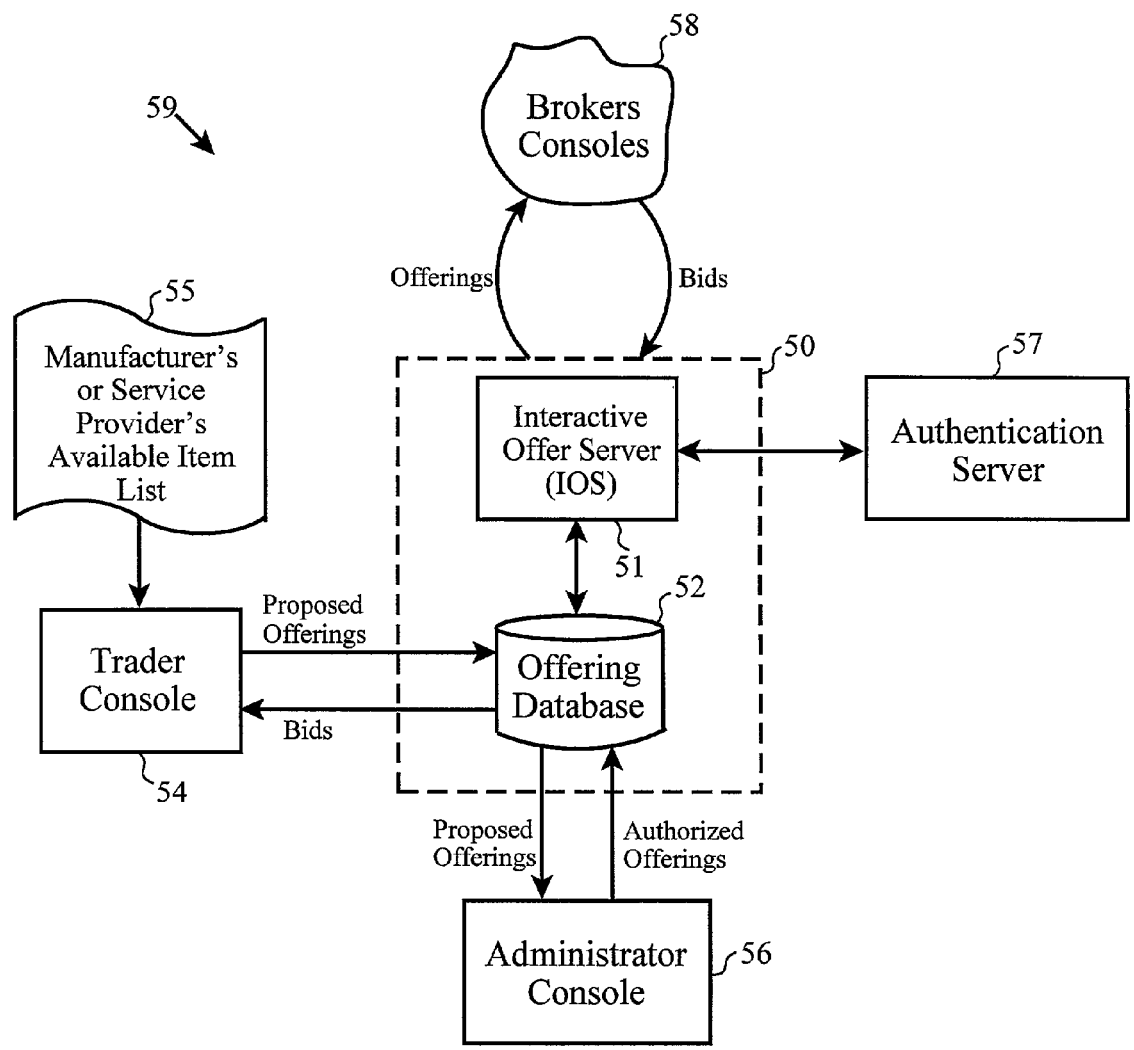
FIG. 5 shows a generalized system architecture of the invention.

Turning to FIG. 5 in which the general architecture of the system of the invention is shown, the Interactive Offer Server ("IOS") (51) is associated with an offering database (52). The offering system (50) is included in the larger architecture (59) which includes the brokers' consoles (58), the administrator console (56), and the traders' consoles (54). All consoles and the interactive offering server may communicate either as an integrated package within one computer system, or as separate computer systems integrated and communicating over a computer network such as the internet.

In the general architecture of FIG. 5, the manufacturer or service provider's goods availability list (55) is received by the trader consoles (54). The trader then creates proposed offerings by filtering the availability list against the broker profile matrices (40) for his broker(s). Those proposed offerings are input into the offering database (52), which are then retrieved by the administrator using his administrator console (56).

The administrator then authorizes the proposed offerings and makes a note or change in the offering database records to indicate such authorization.

During the open bidding process, the brokers may use their consoles, such as web browser personal computers (58), to retrieve their offerings, and to submit bids via the IOS (51). When a broker makes contact with the interactive offering server, his identity is first verified by an Authentication Server (57), according to the preferred embodiment.

In response to the broker's request for products or services offerings, the IOS queries the offering database (52) and presents the broker with offerings which contain items to which he or she is entitled. An authentication server (57) is included in the preferred embodiment so as to allow the interactive offering server to authenticate the broker prior to presenting any offerings to the broker. As such, the general architecture (59) as shown in FIG. 5 provides each broker with one or more offerings which have been authorized and which have been filtered only to show available materials or services on which he is entitled to bid.

Figure 6:
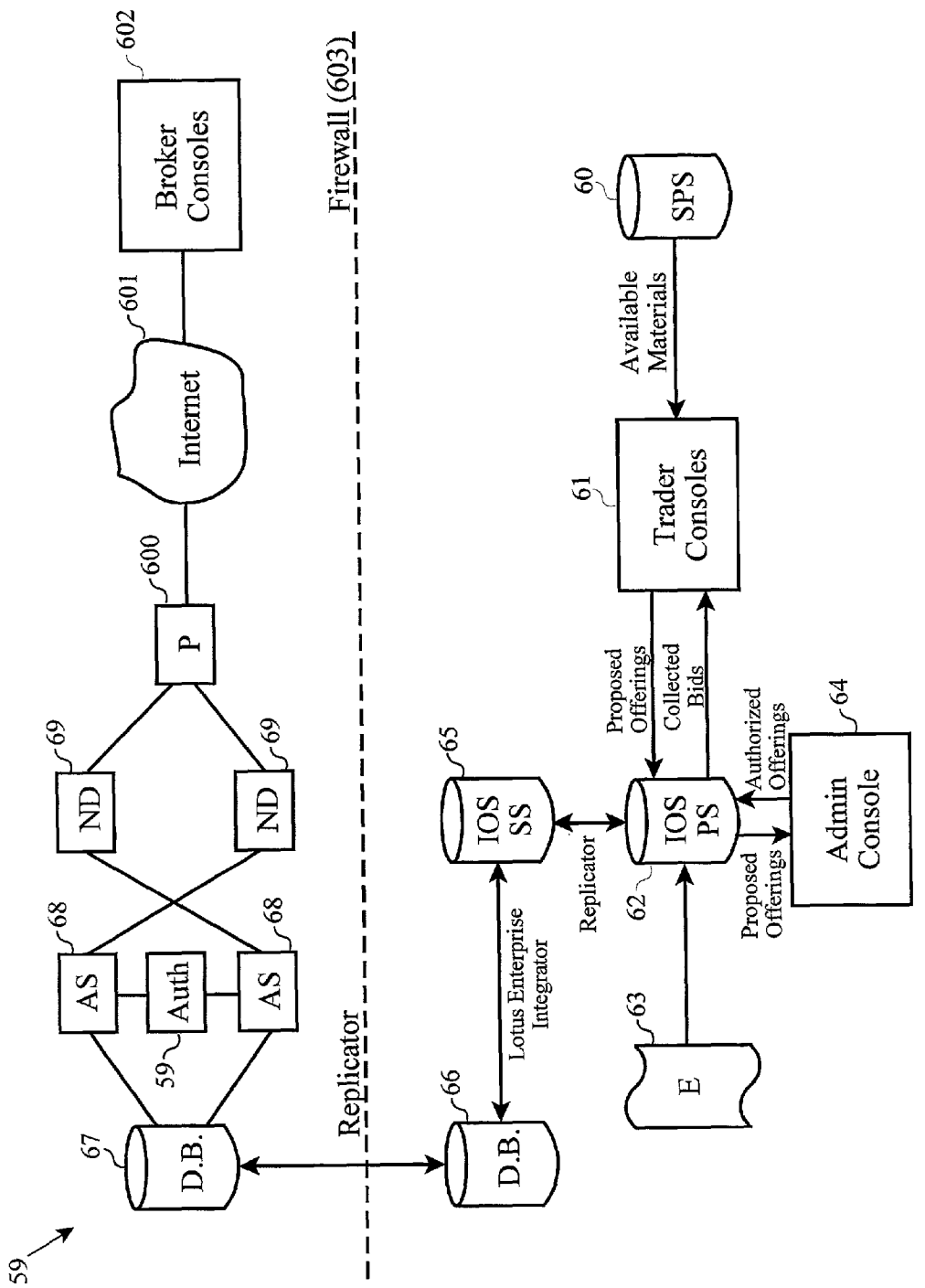
FIG. 6 sets forth the preferred embodiment of the system of the invention.

Turning to FIG. 6, the detailed organization of the system according to the preferred embodiment is shown. According to the preferred embodiment, a sales preparation system (60) comprising an IBM Lotus Notes system provides available materials list to the traders via their trader consoles (61), which are networked personal computers also running Lotus Notes applications. These available materials lists could alternatively be simple text file lists or spreadsheets, as well as database records. Alternatively, the trader consoles (61) may be dedicated computer consoles, web browser computers, or other appropriate computer user interface devices such as wireless web browsers.

The trader console then filters the available materials list for each broker profile or entitlement schema for the trader's brokers, and prepares proposed broker offerings to be stored in the IOS production server (62). The entitlement profile or broker profile (63) is also available to the IOS production server (62) for verification of the trader's proposed offerings.

An administrator may use an administrator's console (64) to query the database of the IOS production server (62) to retrieve and review a trader's proposed offerings. He may authorize all or some of the proposed offerings, and place those authorized offerings in the IOS database for replication to the IOS staging server (65).

Posting of the authorized offerings to the IOS staging server (65) is preferably done by a Lotus Notes replicator function. As both the IOS production server (62) and staging server (65) are based on IBM Lotus Notes systems in the preferred embodiment, the replicator is a natural function of Lotus Notes which is easily incorporated and maintained. An IBM Lotus Enterprise Integrator ("LEI"), formerly known as "Notes Pump", then prepares a DB2 database file (66) from the IOS staging server (65).

Further according to the preferred embodiment, all of these previously described systems and components and processes are executed and placed behind a protective data "fire wall" (603) for system security. The posted available offerings for the brokers are replicated to another database outside the firewall, preferably in a DB2 format (67) again. This "outside" database is available for query by at least one application server (68).

Also according to the preferred embodiment, a clustered pair of application servers (68) are used to query the outside database (67) for available offerings for brokers. The application servers are provided requests from the brokers via network dispatchers (69). The network dispatchers (69) receive broker requests for offerings by a proxy server (600). Thus, the brokers may use their broker consoles (602), such as web browser personal computers or wireless web browsers, to query the outside database (67) via a computer network (601) such as the Internet.

The network dispatchers provide balanced loading to the application servers (68), and they provide for redirection of requests to one of the application servers should the other application server experience a failure. After the brokers receive their offerings of entitled materials or services on which they may bid via their broker consoles (602), they may post bids which are stored in the outside database (67).

The posted bids are then replicated from the outside database (67) to the inside database (66) behind the firewall. The LEI then moves those bids, converts them from DB2 format to Lotus Notes format, and stores them in the IOS staging server (65). These bids are further replicated from the Lotus Notes format in the IOS staging server (65) to the IOS production server (62), where they then may be retrieved and reviewed by the traders using the trader consoles (61). Thus, the entire offering-to-bid process is completed. The traders may then choose to accept or reject each posted bid.

According to the preferred embodiment, the application servers (68) are web server hardware platforms, such as IBM RS6000 computers running the IBM AIX operating system, accompanied by the IBM WebSphere product. Java servlets are used to interact with the broker console computers (602), which could be alternately realized in such technology as Microsoft's Active Server Pages or Java server pages.

Further according to the preferred embodiment, the application servers are provided with communications capability to an authentication server (57) which may include lists of brokers and passwords against which broker log-in attempts may be validated.

Thus, the system and methods disclosed including the preferred embodiment provide a capability to prepare offerings for brokers from traders such that the offerings contain only the information necessary to convey an offering to a broker for product or service for which he is entitled. The preferred embodiment provides a robust and secure architecture to insure that product offerings are made available only to entitled brokers, and that system failure will not result in loss of availability of offering and bidding collection services.

Figure 7:
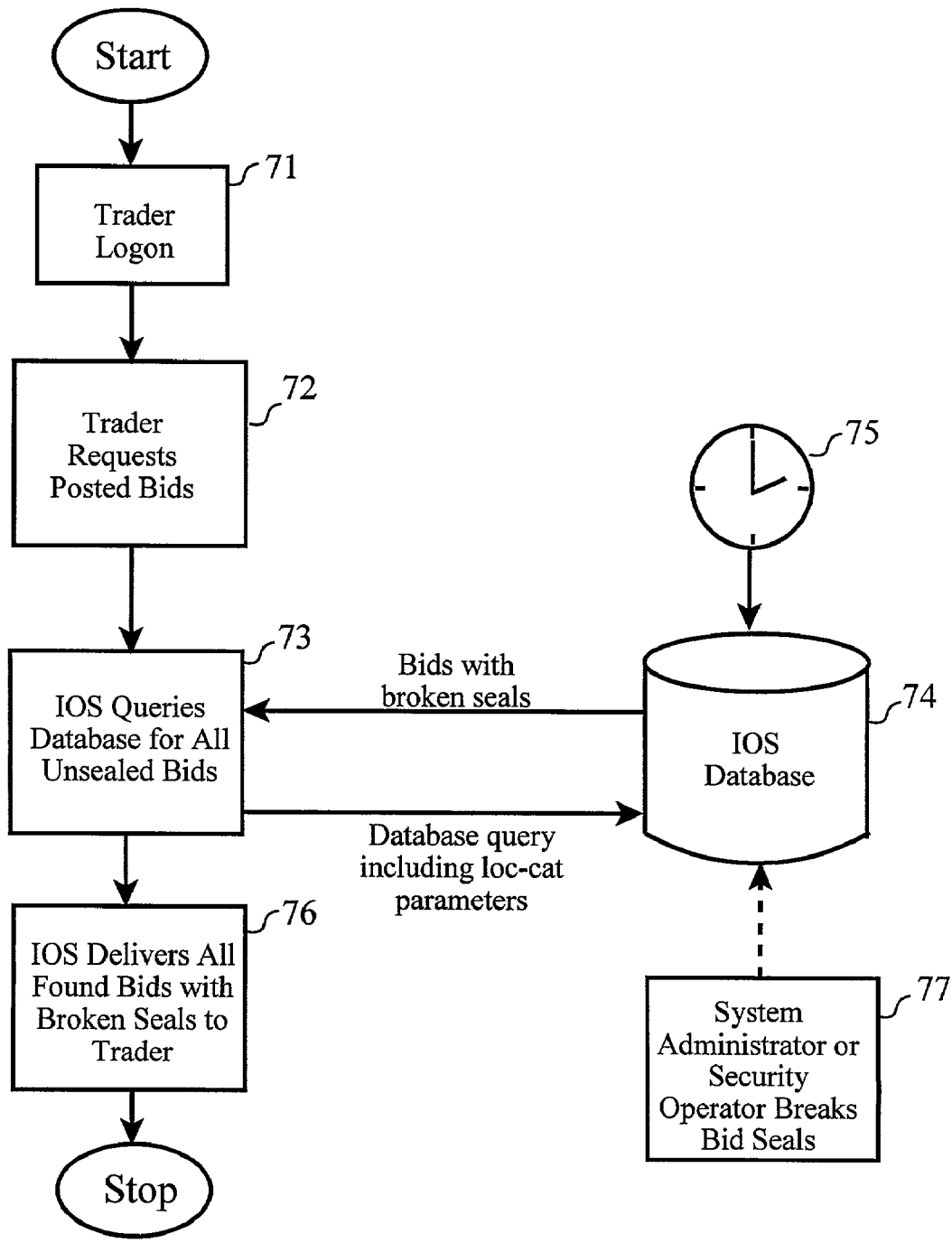
FIG. 7 illustrates the logical flow of the process of restricting a trader's access, as well as other online system personnel's access, to sealed bids in an online offering and bid collection system.

Turning to FIG. 7, the logical flow of the process to present unsealed bids to a trader is shown. A trader logs on (71) which verifies the trader's identity and rights to access the system. The trader then requests all his posted bids (72). The IOS server then queries (73) a database for all bids which have been received and which are unsealed. In the preferred embodiment, the IOS database (74) contains records which represent the collected bids from brokers. One field within these records may be a logical operator to indicate whether a bid is still sealed or unsealed. That logical operator and field may be protected from modification by the trader and system operations personnel, and may only be enabled to be changed by a system administrator or security operator with appropriate authorization.

Thus, as the bidding window is opened and bids are being actively collected, the records produced and saved in the IOS database (74) will by default contain fields which indicate the bids are sealed. Upon the closing of the bidding session or bidding time window, a system administrator or security operator may break the bid seals (77) by modifying each logical operator in each record or by executing a batch program which modifies the logical operator in the fields of the records.

In the preferred embodiment, the IOS server query (73) must only request posted bids from the IOS database server (74) which match the trader's location and category codes and which have logical operators in the records which indicate the bids are unsealed.

An alternative method for providing automatic unsealing of the bids is to provide a clock or timer input (75) to the IOS database server (74). In this alternative embodiment, each record which represents a collected bid may have a field in it indicating an expiration time or date upon which the bid is automatically unsealed. When the bid is collected, the IOS database may either mark the bid as sealed or unsealed, or the IOS server query (73) may simply query for all records for a particular trader matching that trader's location and category codes and which have expiration dates of the same time or before the actual time of the query (73). Using this alternative embodiment, the bids automatically unseal themselves as the system time elapses past the expiration dates stored in each record which represents a collective bid.

After the IOS server database is queried and all bids which are unsealed for a particular trader are retrieved, the IOS server will deliver all found bids with broken seals (76). The trader then may review those unsealed bids and decide which bids to advance to order fulfillment.

It will be understood by those skilled in the art and from the foregoing description that various modifications and changes may be made in the preferred embodiment of the present invention without departing from its spirit and scope. It is intended that this description is for purposes of illustration only and should not be construed in a limiting sense. The scope of this invention should be defined by the following claims.

What is claimed is:

1. A sealed bid sales offering system comprising:
   a bid database in a network computer arrangement containing collected bids, the collected bids each having an associated seal status indication field for indicating whether each bid is a sealed bid or is an unsealed bid;
   a database query server querying the bid database for unsealed bids which match parameters of a Broker Profile Matrix associated with a trader console, the trader console comprising an intermediary third party user console communicably disposed between a bidder user console and broker user console, the trader console operating to buy products or services from the broker user console, and operating to resell the bought products and services to the bidder user console;
   a bid transferor responsive to finding matching unsealed bids for the trader console delivering the matching unsealed bids to the trader console, and preventing delivery of sealed bids to the trader console; and
   a display on the trader console of the delivered matching unsealed bids to a trader console user.

2. The sealed bid sales offering system as set forth in claim 1 wherein the database query server comprises an Internet server.

3. The sealed bid sales offering system as set forth in claim 1 wherein the database query server comprises a Hyper Text Transfer Protocol (HTTP) server.

4. The sealed bid sales offering system as set forth in claim 1 wherein the trader console comprises a web browser.

5. The system as set forth in claim 1 wherein the database query server retrieves unsealed bids from the bid database which meet criteria including a trader's location code.

6. The system as set forth in claim 1 wherein the database query server retrieves unsealed bids from the bid database which meet criteria including a match with a trader's goods category code.

7. The system as set forth in claim 1 further comprising a restricted access administrator console communicative with the bid database converting sealed bids to unsealed bids.

8. The system as set forth in claim 1 further comprising a system clock or timer determining which seals of sealed bids have expired as a criteria for retrieving unsealed bids.

9. A sealed bid sales offering method comprising:
   providing collected bids in a bid database in a network computer arrangement, the collected bids each having an associated seal status indication field for indicating whether each bid is a sealed bid or is an unsealed bid;
   querying by a database query server the bid database for unsealed bids which match parameters of a Broker Profile Matrix associated with a trader console, the trader console comprising an intermediary third party user console communicably disposed between a bidder user console and broker user console;
   operating by the trader console to buy products or services from the broker user console;
   operating by the trader to resell the bought products and services to the bidder user console;
   responsive to finding matching unsealed bids for the trader console, delivering by a bid transferor the matching unsealed bids to the trader console wherein delivery of delivery of sealed bids to the trader console is prevented; and
   displaying on the trader console the delivered matching unsealed bids to a trader console user.

10. The method as set forth in claim 9 wherein the querying comprises a Hyper Text Transfer Protocol (HTTP) query.

11. The method as set forth in claim 9 further comprising providing a web browser trader console.

12. The method as set forth in claim 9 wherein the querying comprises retrieving unsealed bids from the bid database which meet criteria including a trader's location code.

13. The method as set forth in claim 9 wherein the querying comprises retrieving unsealed bids from the bid database which meet criteria including a match with a trader's goods category code.

14. The method as set forth in claim 9 further comprising providing a restricted access administrator console communicative with the bid database, and converting sealed bids to unsealed bids by the administrator console.

15. The method as set forth in claim 9 further comprising using a system clock or timer to determine which seals of sealed bids have expired as a criteria for retrieving unsealed bids.

16. A computer readable memory comprising: a computer readable memory suitable for encoding computer programs; and one or more computer programs encoded by the computer readable memory and configured to:
   provide collected bids in a bid database in a network computer arrangement, the collected bids each having an associated seal status indication field for indicating whether each bid is a sealed bid or is an unsealed bid;
   query by a database query server the bid database for unsealed bids which match parameters of a Broker Profile Matrix associated with a trader console, the trader console comprising an intermediary third party user console communicably disposed between a bidder user console and broker user console;
   operate by the trader console to buy products or services from the broker user console;
   operating by the trader to resell the bought products and services to the bidder user console;
   responsive to finding matching unsealed bids for the trader console, deliver by a bid transferor the matching unsealed bids to the trader console
   wherein delivery of delivery of sealed bids to the trader console is prevented; and
   display on the trader console the delivered matching unsealed bids to a trader console user.

17. The computer readable memory as set forth in claim 16 wherein the querying comprises retrieving unsealed bids from the bid database which meet criteria including a trader's location code.

18. The computer readable memory as set forth in claim 16 wherein the querying comprises retrieving unsealed bids from the bid database which meet criteria including a match with a trader's goods category code.

* * * * *